A. W. BRAND.
WATER HEATER.
APPLICATION FILED APR. 18, 1908.

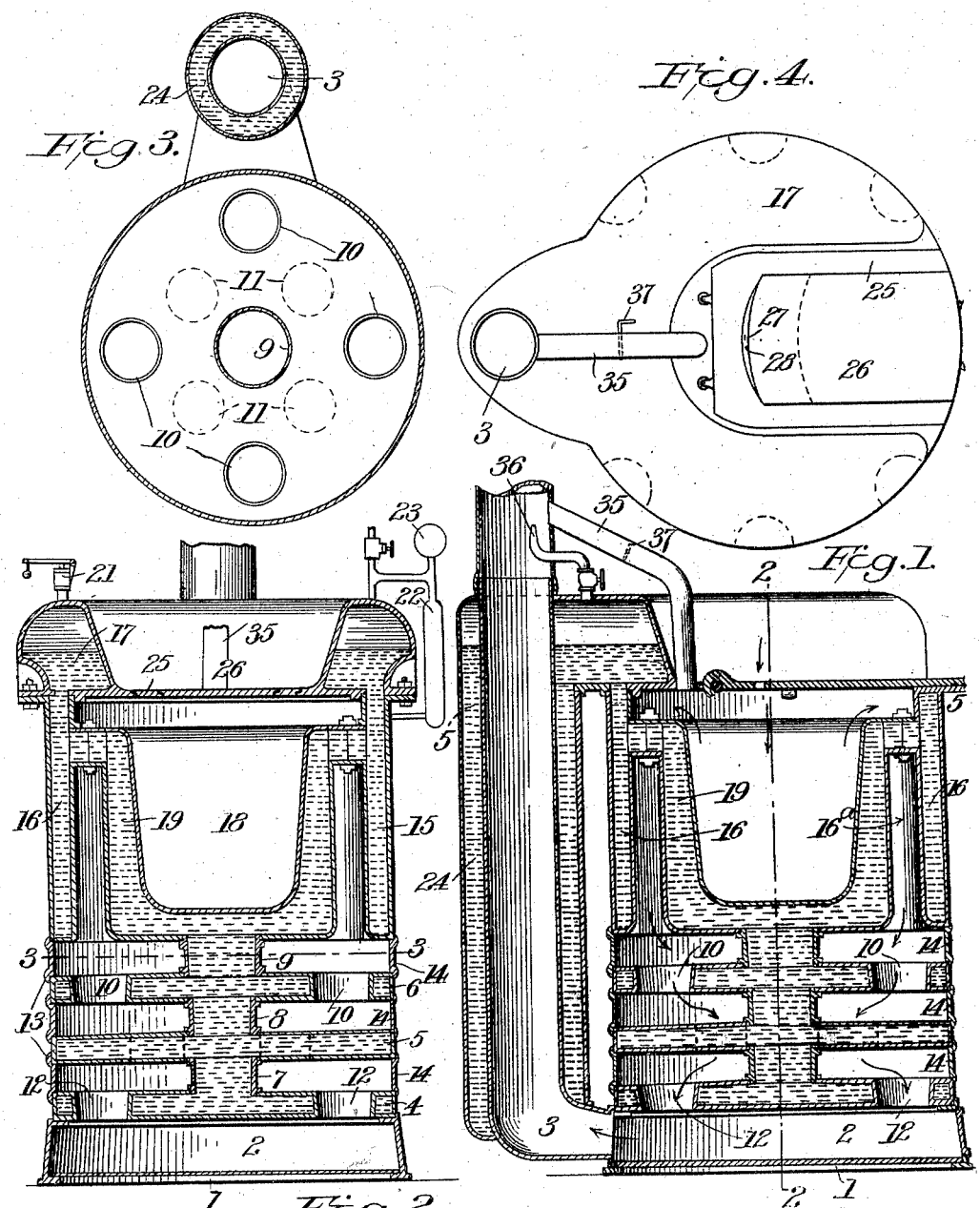

967,715.

Patented Aug. 16, 1910.
2 SHEETS—SHEET 2.

Witnesses
C. H. Walker
Albert Popkins

Inventor
A. W. Brand
By Sturtevant & Mason
Attorneys

UNITED STATES PATENT OFFICE.

ACHILL WALTER BRAND, OF BOISE, IDAHO.

WATER-HEATER.

967,715.  Specification of Letters Patent.  Patented Aug. 16, 1910.

Application filed April 18, 1908. Serial No. 427,827.

*To all whom it may concern:*

Be it known that I, ACHILL WALTER BRAND, a citizen of the United States, residing at Boise, in the county of Ada, State of Idaho, have invented certain new and useful Improvements in Water-Heaters, of which the following is a description, reference being had to the accompanying drawing and to the letters and figures of reference marked thereon.

My invention relates to new and useful improvements in water heaters and more especially to that type of water heaters or boilers wherein the water is heated to sufficient temperature to generate steam which of course may be used for any desired purpose.

An object of my invention is to provide a water heater wherein the surface water or top water may be quickly and intensely heated.

A further object of my invention is to provide a water heater with a fuel chamber which is provided with a down draft wherein the fuel may be consumed much more efficiently.

A further object of my invention is to provide a water heater with a fuel chamber having a down draft wherein all or practically all the black carbon gases are consumed and turned into heat.

A further object of my invention is to provide a water heater which shall be compact in arrangement of parts, and of durable construction and efficient in operation.

Still further objects of my invention will in part be obvious and will in part be more fully hereinafter described.

Figure 6:
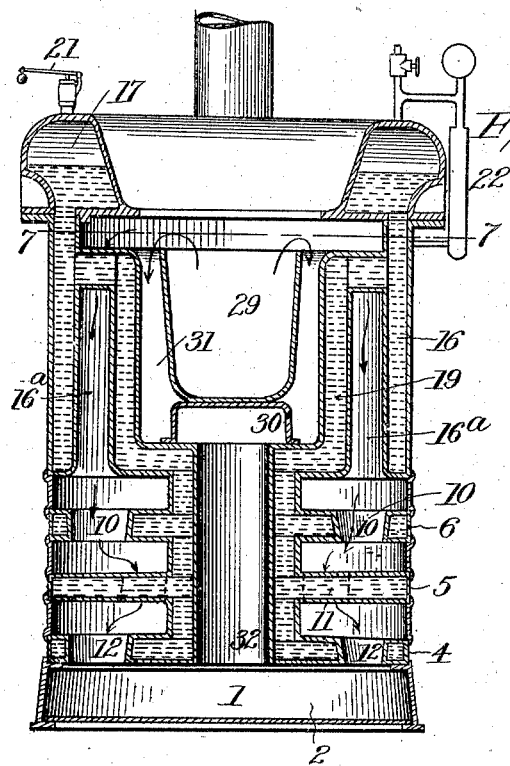
Figure 7:
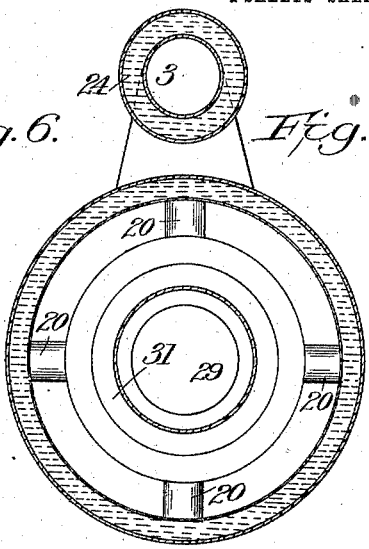
Figure 8:
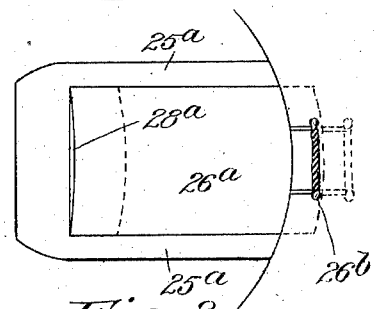
Figure 5:
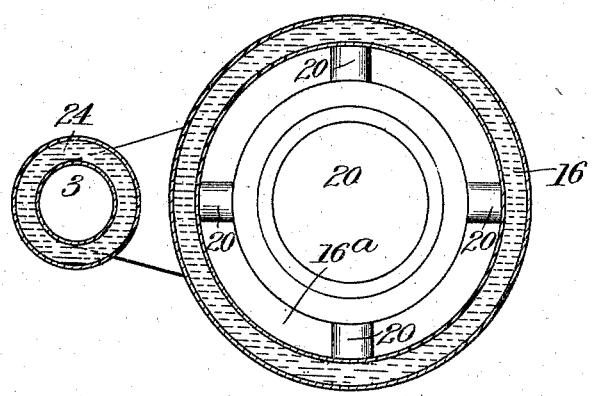

In the drawings which show by way of illustration one embodiment of my invention; Figure 1 is a vertical sectional view from front to rear of a water heater with my improvements applied thereto. Fig. 2 is a vertical section on the line 2—2 of Fig. 1. Fig. 3 is a horizontal sectional view on the line 3—3 of Fig. 2. Fig. 4 is a top plan view of my heater. Fig. 5 is a horizontal sectional view on the line 5—5 of Fig. 1. Fig. 6 is a sectional view similar to Fig. 2 showing a slightly modified form of my heater. Fig. 7 is a horizontal sectional view on the lines 7—7 of Fig. 6. Fig. 8 is a detail view showing a modified form of closure for the top of my heater.

In the present illustrated form of my invention, I have provided a base portion 1 which is hollow, thus forming a flue 2, which is connected with a pipe 3 leading to the chimney.

On top of the base portion 1, I have mounted a series of water pans 4, 5, 6, which are separated and supported by suitable sections 7, 8, 9. The water pan 6, as shown in Fig. 3 is provided with a plurality of passages 10, which lead through the water pans. Said passages as shown in Figs. 1 and 2 are tapered in a downward direction. The water pan 5 is also provided with suitable passages 11 leading therethrough, as shown in dotted lines, in Fig. 3. The passages 11 are out of line with the passages 10, in the water pan 6. The water pan 4 is provided with a plurality of passages 12 which are also out of line with the passages 11 in the water pan 5. I have also provided suitable supporting rings 13, which are located between the water pans, and serve to close the space between the water pans. At the front of the water heater, I may provide doors 14, 14, which serve as suitable means for giving access to the spaces between the water pans for cleaning.

The body proper 15, of my water heater, is mounted upon the ring 13 extending above the water pan 6, and the connecting section 9. Said body of the water heater comprises an outer water chamber 16 which leads into an extension or water chamber 17, at the top of the heater.

Centrally within the body portion, I have located my fire pot 18 which as shown in Figs. 1 and 2 is built in as a part of the heater. Said fire pot is spaced from the inner walls of the heater so as to form a water space 19 extending entirely around the outer side of the fire pot.

The water space 16 is connected to the water space 19 by suitable water pipes 20; see Fig. 5.

The water chamber 17 may be provided with a suitable steam safety valve 21 and with a water gage 22, and also with a thermometer 23 when desired. The joints between the connecting parts of the water pans and the water chambers in the upper part of the heater are of course all made water and steam tight. The water may be supplied to the boiler or heater, in any suitable way and be led therefrom in the ordinary manner.

The water chamber 17 as shown in Fig. 1 extends to the rear of the heater and surrounds the pipe 3 leading to the chimney. Said water chamber also extends downward as at 24 around said pipe. By extending the water heating chamber to the rear of the furnace or boiler and surrounding the flue or pipe leading to the chimney, I thus utilize much of the waste heat in the ordinary construction of boiler.

The water chamber 17, extends across the rear of the boiler and along the sides as shown in Fig. 4. The central and front portions however, are left free so that a suitable cover may be provided for the fire pot, whereby access thereto may be had.

In the present illustrated embodiment of my invention, I have provided a hinged section 25 which is detachably connected to the frame of the heater. Said section 25, is provided with a sliding cover 26 which may have a suitable handle for operating the same. The end 27 of the cover 26, as shown in Fig. 4, is cut on a larger radius than the opening in the movable section 25, so as to leave a space 28 between the end of the sliding section and the edge of the movable section.

The operation of my device is as follows:—Suitable fuel is placed within the fire pot and upon this fuel is placed the kindling. This is ignited and the movable cover 26 is opened slightly so as to admit a down draft of air upon the fuel as indicated by the arrow in Fig. 1. The heated gases pass from the fuel over the edge of the fire pot and down through the space 16$^a$ between the water chambers 16 and 19. These heated gases then circulate about the space above the water pan 6, and down through the passages 10 into spaces over the water pan 5. The heated gases then pass through the spaces 11 then down through spaces 12, into the chamber at the base of the heater, and then out through the pipe 3.

The amount of air admitted to the fire pot may be varied by sliding the cover 26 as indicated in dotted lines in Fig. 4. If however, the cover be entirely closed, the space 28 will admit sufficient air to prevent the fire from going out.

It will be seen that the heated gases are brought quickly and very close to the upper surface of the water in the heater, so that the same is quickly and intensely heated. It will also be seen that the heated gases in my improved device pass very close to all the various parts of the water chambers so that the entire body of water is brought almost directly in contact with the heating medium. Furthermore, by my down draft arrangement, the gases are more thoroughly consumed, thus avoiding the accumulation of soot in the flues, and in the chimney, even when the soft coal is used as a fuel.

In the modification shown in Figs. 6 and 7, I have provided a removable fire pot and what I term a double down draft. The construction of the base 1, the water pans 5, 6, the water chambers 16 and 17 are the same in this form of my invention, as that shown in Fig. 1. The fire pot 29 is however, separated from the inner wall of the chamber 19 and is removably supported upon brackets 30, secured to the inner wall of the water chamber 19. The water chamber 19 is connected to the water chamber 16 by suitable pipes 20. The space 31 between the fire pot 29 and the inner wall of the water chamber 19, forms a passage-way for the heating gases which pass from the fire pot. Centrally through the water pans and the connecting extensions, I have provided a flue 32, which connects with the passage 31, around the fire pot 29. The heated gas passing over the edge of the fire pot may take two downward courses. Said gas may pass down through the passage-way 31 and through the flue 32, to the chamber 2, at the base of the heater and thence, out of the pipe 3, or said gases may pass down through the passage-way 16$^a$ between the water chambers 16 and 19, and thence, through passages 10, 11 and 12, to the chamber 2 at the base of the heater. By this form of my construction, I have provided a double down draft and thereby bring the heated gases even more directly into contact with the various parts of the water chamber, to be heated. In this form of my invention, I may use a safety valve 21 and a water gage 22 such as shown in Fig. 2 of the drawings. In Fig. 8 of the drawing, I have shown the opening in the movable section 25$^a$ as rectangular in outline, and the slide 26$^a$ of similar outline, but having its inner end curved to form a space 28$^a$, for the same purpose as the space 28 shown in Fig. 8 of the drawing. I have also shown the slide 26 as provided with a suitable handle 26$^b$. In dotted lines in this figure, I have indicated the movement of the slide 26$^a$. While I have shown herein my construction as applied to an upright water heater or boiler, it is obvious that from certain aspects of my invention, said heater or boiler may be of any desired shape or arrangement.

While I have only shown one fuel chamber or firepot, it is very evident a plurality of fuel chambers may be arranged side by side.

I have shown in Figs. 1 and 2, my furnace provided with a direct draft pipe 35, which may be used in starting the fire if desired. The damper 37 serves to control the pipe draft through the pipe. As soon as the fire is started, the draft is entirely closed. I have also shown a force draft pipe 36 leading from the steam chamber to the stack pipe.

Having thus particularly described my invention, what I claim as new and desire to secure by Letters Patent is:

1. A boiler including in combination, a fire pot, means for directing a down draft on the fuel in said fire pot, a water chamber surrounding said fire pot, and extending underneath the same, flues leading down through said water chamber, a pipe connected with said flues at the base of the boiler, and extending up the side of said boiler, and a water chamber surrounding said pipe, and connected with the water chamber, around said fire pot.

2. A boiler including in combination, a fire pot having a closed bottom, means for directing a down draft on the fuel in said fire pot, a water chamber surrounding said fire pot and extending underneath the same, flues connecting with the upper end of said fire pot and extending down through said water chamber to the base of the boiler, a pipe connected with said base and extending up the side of the boiler, and a water chamber surrounding said pipe, and connected with the water chamber surrounding said fire pot.

3. A boiler including in combination, a fire pot having a closed bottom and closed sides, a water chamber entirely surrounding the sides of said fire pot and extending underneath the same, flues connecting with the upper end of said fire pot and extending down through the water chamber in the boiler and a pipe connected to said base and extending up the sides of the boiler.

4. A boiler including in combination, a fire pot having a closed bottom and closed sides, a water chamber entirely surrounding the sides of said fire pot and extending underneath the same, flues connecting with the upper end of said fire pot and extending down through the water chamber in the boiler, and a pipe connected to said base and extending up the sides of the boiler, said boiler having means for closing over the fire pot including a sliding cover whereby the draft directed downwardly upon the fuel in the fire pot may be controlled.

5. A boiler including in combination, a base portion having a flue therein, a plurality of water pans mounted on said base portion, a water chamber mounted on said water pans, a fire pot located centrally within said water chamber, a space between said fire pots and said water chamber, forming a flue, a flue connected with said space, and leading centrally down through said water pans and independent flues extending down through said water chamber and said water pans, whereby a double down draft from said fire pot is secured.

6. A boiler including in combination a base portion having a flue therein, a plurality of water pans mounted on said base portion, a water chamber mounted on said water pans, a fire pot located centrally within said water chamber, a space between said fire pots and said water chamber, forming a flue, a flue connected with said space and leading centrally down through said water pans, independent flues extending down through said water chamber and said water pans, whereby a double down draft from said fire pot is secured, said fire pot being closed at its bottom and means for directing a down draft on the fuel in the fire pot.

7. A boiler including in combination, a fire pot, a sliding cover for said fire pot, the inner end of said slide being shaped so that when said slide is closed, a space is left for a down draft on the fuel in the fire pot, a water chamber surrounding said fire pot, flues connected with said fire pot, and leading down through said water chamber.

8. A boiler including in combination, a base portion, having a flue, a water pan mounted thereon having passages therethrough, a second water pan spaced from said first water pan, and having a connection therewith, passages through said second water pan arranged out of line with the passages in the first water pan, a third water pan supported by said second water pan, and having a connection therewith, passages through said third water pan, arranged out of line with the passages in said second water pan, a water chamber located above said third water pan, and spaced therefrom and connected thereto, a fire pot located centrally within said water chamber and flues connecting said fire pot with the passages through said water pans.

9. A boiler including in combination a fire pot, means for directing the draft in a downward direction on the fuel in the fire pot, flues leading from said fire pot, a pipe connected to said flues and a water chamber having a portion thereof surrounding said pipe.

In testimony whereof I affix my signature, in presence of two witnesses.

ACHILL WALTER BRAND.

Witnesses:
B. Q. PETTENGILL,
M. J. BUSH.